US011132772B2

(12) United States Patent
Luo et al.

(10) Patent No.: US 11,132,772 B2
(45) Date of Patent: Sep. 28, 2021

(54) ASYMMETRIC NORMALIZED CORRELATION LAYER FOR DEEP NEURAL NETWORK FEATURE MATCHING

(71) Applicant: Samsung Electronics Co., Ltd., Suwon-si (KR)

(72) Inventors: Chenchi Luo, Plano, TX (US); Yingmao Li, Allen, TX (US); Youngjun Yoo, Plano, TX (US); George Q. Chen, Plano, TX (US); Kaimo Lin, Richardson, TX (US); David D. Liu, Mountain View, CA (US); Gyeongmin Choe, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 16/712,882

(22) Filed: Dec. 12, 2019

(65) Prior Publication Data

US 2020/0394759 A1    Dec. 17, 2020

Related U.S. Application Data

(60) Provisional application No. 62/936,115, filed on Nov. 15, 2019, provisional application No. 62/859,825, filed on Jun. 11, 2019.

(51) Int. Cl.
*G06T 5/00* (2006.01)
*G06T 7/80* (2017.01)
*H04N 13/128* (2018.01)

(52) U.S. Cl.
CPC ............. *G06T 5/002* (2013.01); *G06T 7/85* (2017.01); *H04N 13/128* (2018.05); *G06T 2207/10028* (2013.01); *G06T 2207/20084* (2013.01)

(58) Field of Classification Search
CPC . G06T 2207/10028; G06T 2207/20084; G06T 7/593; G06T 7/85; G06T 7/33;
(Continued)

(56) References Cited

U.S. PATENT DOCUMENTS 8,630,480 B2 *  1/2014  Takahashi ............... G06T 5/009
                                                    382/154
8,971,611 B2 *  3/2015  Takeshita ............. H04N 13/261
                                                    382/154

(Continued)

FOREIGN PATENT DOCUMENTS

JP      2019-139713 A    8/2019
JP          6606610 B2   11/2019
KR   10-2019-0125141 A   11/2019

OTHER PUBLICATIONS

International Search Report and Written Opinion of the International Searching Authority dated Jan. 29, 2021 in connection with International Patent Application No. PCT/KR2020/015335, 8 pages.

(Continued)

*Primary Examiner* — Manav Seth

(57) ABSTRACT

A method includes obtaining a first image of a scene using a first image sensor of an electronic device and a second image of the scene using a second image sensor of the electronic device. The method also includes generating a first feature map from the first image and a second feature map from the second image. The method further includes generating a third feature map based on the first feature map, the second feature map, and an asymmetric search window. The method additionally includes generating a depth map by restoring spatial resolution to the third feature map.

20 Claims, 7 Drawing Sheets

(58) Field of Classification Search
CPC . G06T 2207/10021; G06T 2207/20228; G06T 7/32; G06K 9/00201; G06K 9/00268; H04N 2013/0081; H04N 13/271; H04N 13/128; H04N 13/204; H04N 13/243

See application file for complete search history.

(56) References Cited

U.S. PATENT DOCUMENTS

| | | | | |
|---|---|---|---|---|
| 9,007,441 | B2* | 4/2015 | Sun | H04N 13/239 |
| | | | | 348/47 |
| 9,147,118 | B2* | 9/2015 | Lin | G06K 9/6204 |
| 9,159,154 | B2* | 10/2015 | Kim | H04N 13/128 |
| 9,288,392 | B2* | 3/2016 | Chuang | H04N 5/23248 |
| 9,355,436 | B2* | 5/2016 | Zhang | G06T 15/00 |
| 10,212,409 | B2* | 2/2019 | Zhao | G06F 3/01 |
| 10,805,514 | B2* | 10/2020 | Lee | H04N 13/271 |
| 10,832,061 | B2 | 11/2020 | Kakegawa et al. | |
| 10,839,535 | B2* | 11/2020 | Javidnia | G06K 9/6215 |
| 10,977,802 | B2* | 4/2021 | Wilson | G06T 7/194 |
| 2010/0103249 | A1* | 4/2010 | Lipton | H04N 13/128 |
| | | | | 348/51 |
| 2013/0033582 | A1* | 2/2013 | Sun | H04N 13/122 |
| | | | | 348/47 |
| 2014/0198977 | A1* | 7/2014 | Narasimha | G06T 5/007 |
| | | | | 382/154 |
| 2015/0022518 | A1* | 1/2015 | Takeshita | H04N 13/122 |
| | | | | 345/419 |
| 2018/0027224 | A1* | 1/2018 | Javidnia | H04N 13/128 |
| | | | | 382/154 |
| 2018/0059679 | A1* | 3/2018 | Taimouri | G06T 7/50 |
| 2018/0286040 | A1 | 10/2018 | Sashida | |
| 2019/0311249 | A1 | 10/2019 | Zhang et al. | |
| 2019/0333237 | A1* | 10/2019 | Javidnia | G06T 3/4007 |
| 2020/0026986 | A1 | 1/2020 | Ha et al. | |

OTHER PUBLICATIONS

Mayer et al., "A Large Dataset to Train Convolutional Networks for Disparity, Optical Flow, and Scene Flow Estimation", 2016 IEEE Conference on Computer Vision and Pattern Recognition (CVPR), Jun. 2016, 14 pages.

Karami et al., "Image Matching Using SIFT, SURF, BRIEF and ORB: Performance Comparison for Distorted Images", Proceedings of the 2015 Newfoundland Electrical and Computer Engineering Conference, Nov. 2015, 5 pages.

Atienza, "Fast Disparity Estimation using Dense Networks", 2018 IEEE International Conference on Robotics and Automation (ICRA), May 2018, 6 pages.

Dosovitskiy et al., "FlowNet: Learning Optical Flow with Convolutional Networks", 2015 IEEE International Conference on Computer Vision (ICCV), Dec. 2015, 9 pages.

Hirschmuller, "Stereo Processing by Semi-Global Matching and Mutual Information", IEEE Transaction on Pattern Analysis and Machine Intelligence, Apr. 2007, 14 pages.

* cited by examiner

ASYMMETRIC NORMALIZED CORRELATION LAYER FOR DEEP NEURAL NETWORK FEATURE MATCHING

CROSS-REFERENCE TO RELATED APPLICATION AND CLAIM OF PRIORITY

This application claims priority under 35 U.S.C. § 119(e) to U.S. Provisional Patent Application No. 62/936,115 filed on Nov. 15, 2019 and U.S. Provisional Patent Application No. 62/859,825 filed on Jun. 11, 2019, which are hereby incorporated by reference in their entirety.

TECHNICAL FIELD

This disclosure relates generally to image capturing systems. More specifically, this disclosure relates to an asymmetric normalized correlation layer for deep neural network feature matching.

BACKGROUND

Many mobile electronic devices, such as smartphones and tablet computers, include cameras that can be used to capture still and video images. While convenient, cameras on mobile electronic devices typically suffer from a number of shortcomings that reduce their image quality. Various machine learning algorithms can be used in a number of image processing-related applications to improve the quality of images captured using mobile electronic devices or other devices. For example, different neural networks may be trained and then used to perform different image processing tasks to improve the quality of captured images. As a particular example, a neural network may be trained and used to blur specific portions of captured images.

SUMMARY

This disclosure provides an asymmetric normalized correlation layer for deep neural network feature matching.

In a first embodiment, a method includes obtaining a first image of a scene using a first image sensor of an electronic device and a second image of the scene using a second image sensor of the electronic device. The method also includes generating a first feature map from the first image and a second feature map from the second image. The method further includes generating a third feature map based on the first feature map, the second feature map, and an asymmetric search window. In addition, the method includes generating a depth map by restoring spatial resolution to the third feature map.

In a second embodiment, an electronic device includes a first image sensor, a second image sensor, and at least one processor operatively coupled to the first and second image sensors. The at least one processor is configured to obtain a first image of a scene using the first image sensor and a second image of the scene using the second image sensor. The at least one processor is also configured to generate a first feature map from the first image and a second feature map from the second image. The at least one processor is further configured to generate a third feature map based on the first feature map, the second feature map, and an asymmetric search window. In addition, the at least one processor is configured to generate a depth map by restoring spatial resolution to the third feature map.

In a third embodiment, a non-transitory machine-readable medium contains instructions that, when executed, cause at least one processor of an electronic device to obtain a first image of a scene using a first image sensor of the electronic device and a second image of the scene using a second image sensor of the electronic device. The medium also contains instructions that, when executed, cause the at least one processor to generate a first feature map from the first image and a second feature map from the second image. The medium further contains instructions that, when executed, cause the at least one processor to generate a third feature map based on the first feature map, the second feature map, and an asymmetric search window. In addition, the medium contains instructions that, when executed, cause the at least one processor to generate a depth map by restoring spatial resolution to the third feature map.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HIVID), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
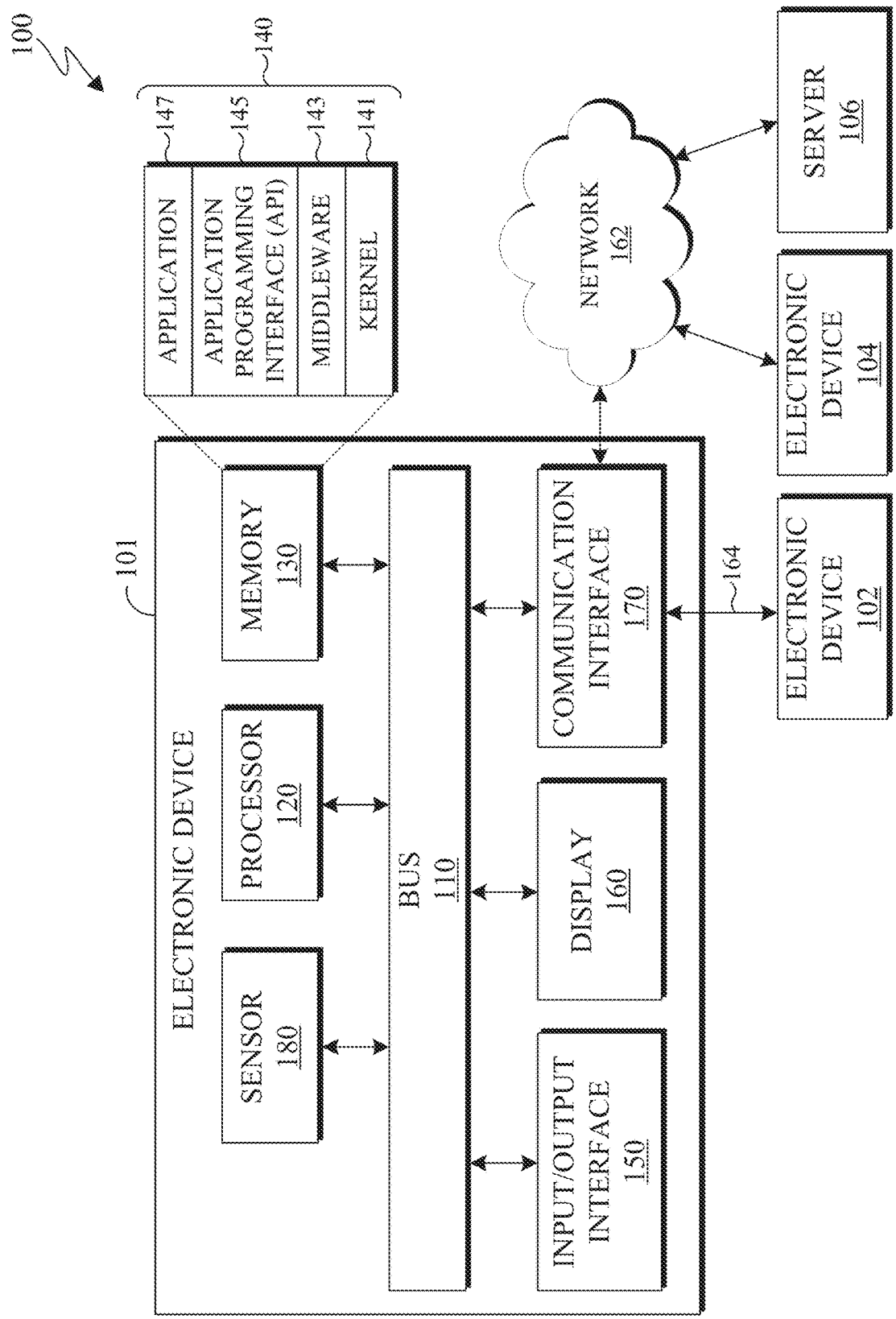
FIG. 1 illustrates an example network configuration including an electronic device in accordance with this disclosure.

FIGS. 1 through 7, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. However, cameras on mobile electronic devices typically suffer from a number of shortcomings as compared to digital single lens reflect (DSLR) cameras. For example, DSLR cameras can create a soft focus effect (also known as the Bokeh effect) due to changes in the depth of field (DoF) of a captured image. The Bokeh effect can be created by using a lens with a wide aperture in a DSLR camera, which causes a softness or blurring outside of a particular depth of field in which a subject in an image is focused. Cameras on mobile electronic devices are often unable to selectively blur a portion of an image that is outside of a particular depth of field, since most cameras on mobile electronic devices generate an image where the entire image is in focus.

Various machine learning algorithms can be used in a number of image processing-related applications, including applications that computationally (rather than optically) create the Bokeh effect in images captured using mobile electronic devices or other devices. For example, different neural networks can be trained and used to perform different image processing tasks to improve the quality of captured images. Each neural network is typically trained to perform a specific task. For instance, in the image processing realm, different neural networks can be trained to recognize types of scenes or objects in the scenes, identify depths of objects in scenes, segment images based on objects in scenes, or generate high dynamic range (HDR) images, Bokeh images, or super-resolution images.

Embodiments of this disclosure describe various techniques to create the Bokeh effect and other image processing effects in images captured using mobile electronic devices or other devices. As described in more detail below, a synthetic graphics engine can be used to generate training data with particular characteristics. The synthetic graphics engine is used to generate training data that is tailored for specific mobile electronic devices or other devices. An evaluation methodology can be used to test the quality of a depth map (or a disparity map), which can be generated by a neural network that is trained using the training data. Depth or disparity maps can be used to identify depth in a scene, which (in some cases) allows more distant portions of an image of the scene to be computationally blurred to provide the Bokeh effect. In some embodiments, a wavelet synthesis neural network (WSN) architecture can be used to generate high-definition depth maps. To generate high-definition depth maps, the WSN architecture includes an invertible wavelet layer and a normalized correlation layer. The invertible wavelet layer is applied to iteratively decompose and synthesize feature maps, and the normalized correlation layer is used for robust dense feature matching that is coupled to the specifications of a camera (including a baseline distance between multiple cameras and calibration accuracy when images from multiple cameras are calibrated).

Additional details regarding a neural network architecture that includes an asymmetric normalized layer are provided below. It should be noted here that while a feature map that is generated based on the invertible wavelet layer and the asymmetric normalized layer is often described as being used to perform specific image processing tasks, the neural network architecture provided in this disclosure is not limited to use with these specific image processing tasks or to use with image processing in general. Rather, the asymmetric normalized layer of a neural network may be used in any suitable system to perform feature matching.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or one or more sensors 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments, the processor 120 processes image data using a neural network architecture to perform feature matching using an invertible wavelet layer and an asymmetric normalized correlation layer to generate a single feature map from multiple images of scenes. This can be done to support various image processing functions, such as to create the Bokeh effect in an image.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted as an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture and image processing using a neural network architecture as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HIVID), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 processes image data using a neural network architecture to perform feature matching using an invertible wavelet layer and an asymmetric normalized correlation layer to generate a single feature map from multiple images of scenes. This can be done to support various image processing functions, such as to create the Bokeh effect in an image.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2B:
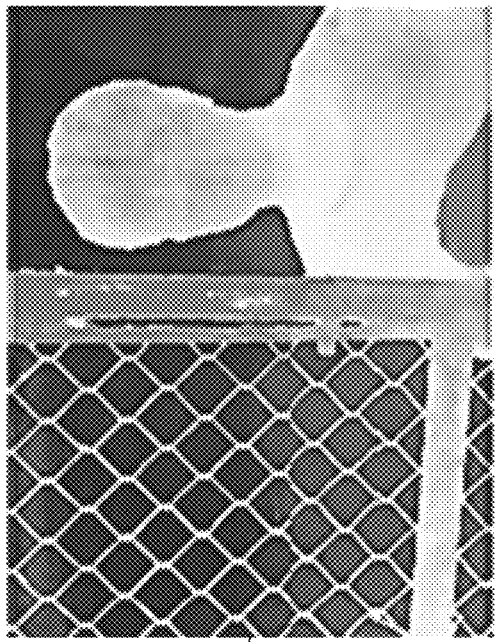
FIGS. 2A, 2B, and 2C illustrate an example input image and an example processing result that may be obtained using an asymmetric normalized correlation layer in a neural network in accordance with this disclosure.
Figure 2A:
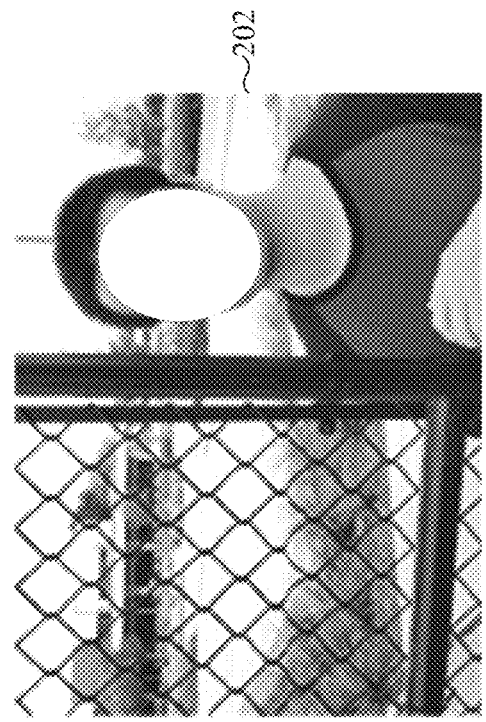
Figure 2C:
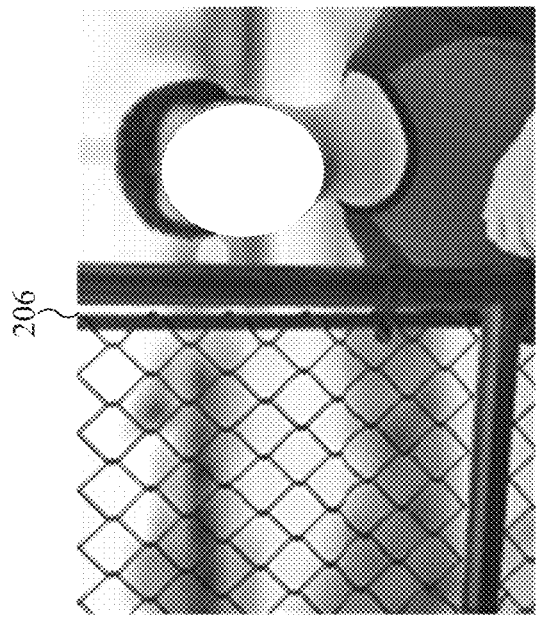

FIGS. 2A, 2B, and 2C illustrate an example input image and an example processing result that may be obtained using an asymmetric normalized correlation layer in a neural network in accordance with this disclosure. In this particular example, a neural network (such as a wavelet synthesis neural network) is being used to generate a depth map, which is then used to create the Bokeh effect from an original image. However, a neural network such as the wavelet synthesis neural network may be used to perform any other suitable tasks, whether or not related to image processing. For ease of explanation, the input image and processing result shown in FIGS. 2A, 2B, and 2C are described in relation to the electronic device 101 or the server 106 in the network configuration 100 of FIG. 1. However, a neural network with an asymmetric normalized correlation layer may be used by any other suitable device(s) and in any other suitable system(s).

As shown in FIG. 2A, an image 202 to be processed by a neural network is received, such as when the image 202 is received from at least one camera (sensor 180) of the electronic device 101. In this example, the image 202 represents an image with a person next to a chain-link fence in the foreground, and the background includes both a field and a building. Although the person's face is obscured for privacy, the foreground and the background are all in focus, which is common with devices such as smartphones and tablet computers. In some embodiments, the image 202 may be produced using two images captured by two different cameras of the electronic device 101. In these embodiments, the two images are calibrated to resolve any differences between the two cameras, such as the use of different lenses, different fields of view, different focuses, and the like.

As shown in FIG. 2B, a depth map 204 is generated by the neural network. The depth map 204 generally identifies different depths in different portions of the scene captured in the image 202 (or the pair of images used to produce the image 202). In this example, lighter colors represent shallower or smaller depths, and darker colors represent deeper or larger depths. In some embodiments, two input images are used to generate the depth map 204. For example, using two cameras that are spaced a known distance apart, each camera can capture an image of the same scene. The neural network can then compare locations of the same points of the scene in the different images to determine the disparity of those points in the images. An inverse relationship exists between the disparity of each point in the images and the depth of that point in the scene. For example, larger disparities indicate that points are closer to the electronic device 101, and smaller disparities indicate that points are farther from the electronic device 101. Thus, the disparities of various points in the scene can be computed and used to generate the depth map 204 (or the disparities can be used to generate a disparity map).

The depth map 204 in FIG. 2B identifies, on a pixel-by-pixel basis, the distances between the electronic device 101 and different areas or portions in the scene being imaged. As illustrated here, the background is generally dark, which indicates that the background is the sufficiently far from the camera (which in some cases may be referred to as an infinite distance). That is, the disparity between common points in the background as captured in multiple images is negligible. The portions of the depth map 204 that are lighter includes the person and the chain-link fence, which indicates that there is a larger or more measurable disparity between common points in the foreground as captured in multiple images.

As shown in FIG. 2C, an image 206 is generated based on the image 202 and the depth map 204. As illustrated in the image 206, the background of the scene has been computationally blurred to produce the Bokeh effect in the image 206, while objects in the foreground of the scene (such as the person and the chain-link fence) are in focus. The electronic device 101 or the server 106 can produce the image 206 by applying a variable amount of blur to the image 202, where the amount of blur applied to each portion (or each pixel) of the image 202 is based on the depth map 204. Thus, for example, maximum blurring can be applied to the pixels of the image 202 associated with the darkest colors in the depth map 204, and minimal or no blurring can be applied to the pixels of the image 202 associated with the lightest colors in the depth map 204.

As described in more detail below, a neural network (such as a wavelet synthesis neural network) is used to generate the depth map 204, and the resulting depth map 204 is then used to perform some image processing function (such as Bokeh generation). The neural network includes an invertible wavelet layer and a normalized correlation layer, which are described in more detail below.

Although FIGS. 2A, 2B, and 2C illustrate one example of an input image and one example of a processing result that may be obtained using an asymmetric normalized correlation layer in a neural network, various changes may be made to these figures. For example, these figures are merely meant to illustrate one example of the type of results that could be obtained using the approaches described in this disclosure. Images of scenes can vary widely, and the results obtained using the approaches described in this patent document can also vary widely depending on the circumstances.

Figure 3:
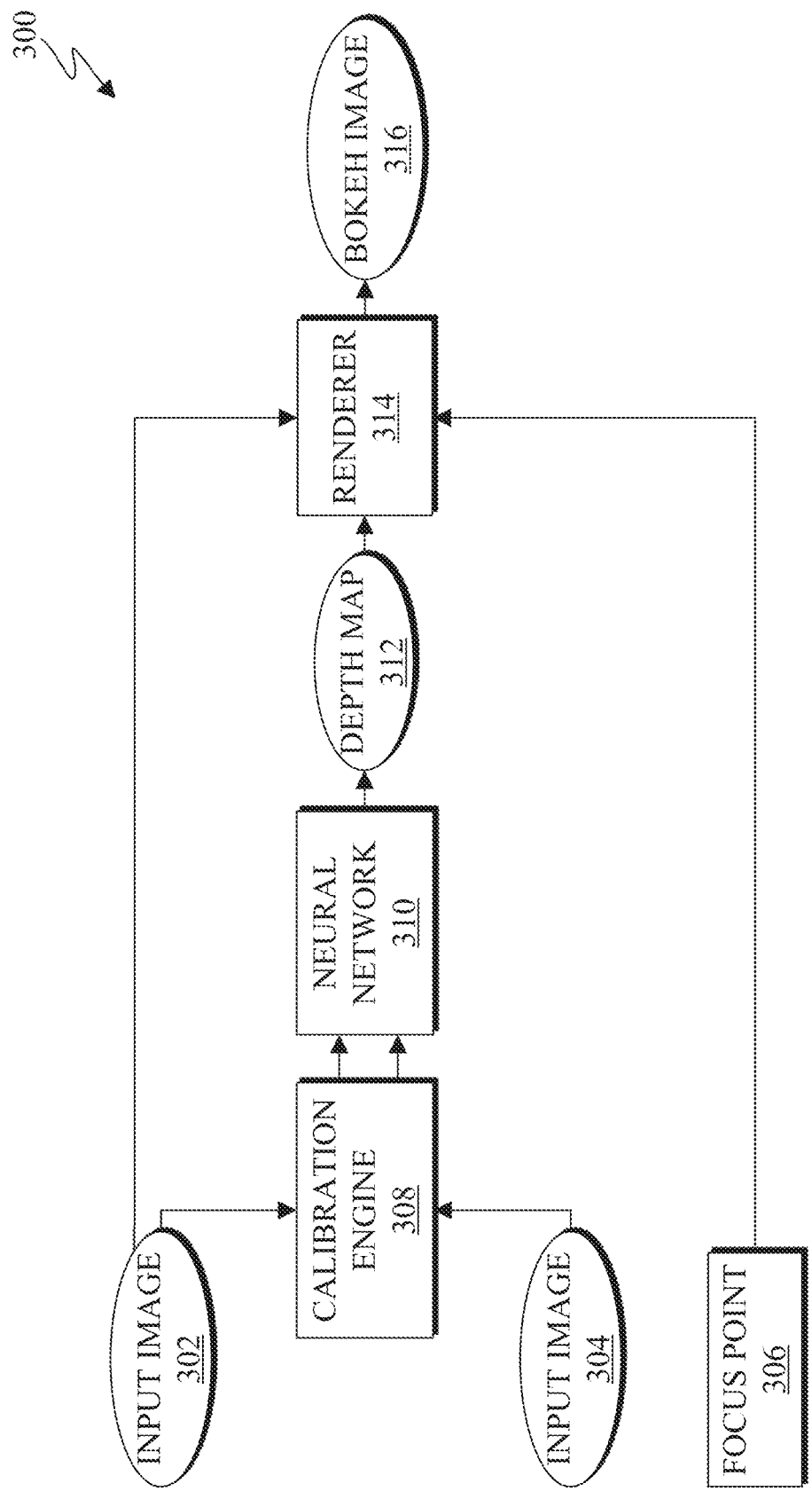
FIG. 3 illustrates an example neural network architecture in accordance with this disclosure.

FIG. 3 illustrates an example neural network architecture 300 in accordance with this disclosure. For ease of explanation, the neural network architecture 300 is described as being implemented using the electronic device 101 or the server 106 in the network configuration 100 of FIG. 1. However, the neural network architecture 300 may be used by any other suitable device(s) and in any other suitable system(s). Also, the neural network architecture 300 is described as being used to perform specific image processing-related tasks, such as creating the Bokeh effect in an image. However, the neural network architecture 300 may be used to perform any other suitable tasks, including non-image processing tasks.

As shown in FIG. 3, the neural network architecture 300 is configured to receive and process input data, which in this example includes an input image 302 and an input image 304. The input images 302 and 304 may be received from any suitable source(s), such as from two cameras (one or more sensors 180) of the electronic device 101. The neural network architecture 300 generally operates here to process the input images 302 and 304 and generate various outputs. In this example, the outputs include a depth map 312 and a Bokeh image 316.

The depth map 312 may be similar to the depth map 204 of FIG. 2B in that it can identify (possibly on a pixel-by-pixel basis) depth in a scene being imaged. Thus, the depth map 312 represents apparent pixel differences between the input images 302 and 304 (for disparity) or the apparent depth of pixels in one or more images 302 and 304 (for depth). In the absence of motion, the disparity between the same point in the input images 302 and 304 is inversely proportional to depth, so a disparity map may be used when computing a depth map (or vice versa). The Bokeh image 316 may be similar to the image 206 of FIG. 2C in that it can include a computationally-blurred background. Thus, the Bokeh image 316 generally represents an image in which the background of the image has been digitally blurred, where the image is based on the input image 302 and/or the input image 304.

In this example, the neural network architecture 300 includes a calibration engine 308, which resolves differences between the input images 302 and 304 (such as differences based on the cameras that captured the images 302 and 304). For example, if the camera that captured the input image 302 used a wide angle lens while the camera that captured the input image 304 used a telephoto lens, the input images 302 and 304 have captured different parts of the same scene. For instance, the input image 304 may represent a larger magnification of the scene as compared to the input image 302. The calibration engine 308 modifies one or both of the input images 302 and 304 so that the images depict similar views of the scene. The calibration engine 308 can also calibrate the input images 302 and 304 based on other differences associated with the cameras, such as different objects of focus, different fields of view, and the like.

A neural network 310 receives the input images 302 and 304 (as modified by the calibration engine 308) and processes the calibrated images to generate the depth map 312. In this example, the two inputs to the neural network 310 correspond to the two input images 302 and 304 as calibrated by the calibration engine 308. As described in more detail below, the neural network 310 generally includes feature extractors (encoder), a normalized correlation layer, and refinement layers (decoder) that are used to generate the depth map 312 from two or more images. In some embodiments, the neural network 310 also includes an invertible wavelet layer. Note that while the neural network 310 receives two input images here, more than two input images of a scene may also be received and processed. It should be noted that, as the number of input images that the neural network 310 receives increases, the fidelity of the depth map 312 also increases.

The feature extractors of the neural network 310 generally operate to extract high-level features from the calibrated input images 302 and 304 to generate two or more feature maps. The neural network 310 can use feature extractors that include convolution and pooling layers to reduce the spatial resolution of the input images while increasing the depth of the feature maps. In some embodiments, the neural network 310 uses the same number of feature extractors as the number of input images so that each feature extractor branch corresponds to one input image. For example, if two images (such as the input images 302 and 304) are input into the neural network 310, a first feature extractor can generate a first feature map corresponding to the input image 302, and a second feature extractor can generate a second feature map corresponding to the input image 304. In those embodiments, the input to each feature extractor is an RGB image (such as the input image 302 or 304) or other image data. In some embodiments, the feature extractors can feed-forward intermediate feature maps to the refinement layers. In some cases, the feature maps that are generated by the feature extractors of the neural network 310 can include three dimensional (3D) feature maps, where the dimensions include height (H), width (W), and channel (C).

After generating the feature maps, a normalized correlation layer of the neural network 310 performs matching in the feature map space to generate a new feature map. For example, the normalized correlation layer may calculate the cross-correlation between two or more feature maps. In some embodiments, an asymmetric normalized correlation layer performs a normalized comparison between the feature maps. At each search direction w, the asymmetric normalized correlation layer identifies the similarity d between the two feature maps. In particular embodiments, Equation (1) below describes how the asymmetric normalized correlation layer identifies the similarity between multiple feature maps.

$$d = \frac{1}{N} \sum_{\omega \in [-a,a] \times [-b,b]} <f_0(c_0), f_1(c_0 + \omega)> \quad (1)$$

The new feature map generated by the normalized correlation layer can have the dimensions (H, W, C'), where C' is determined based on the size of an asymmetric search window used by the normalized correlation layer. The asymmetric search window (and correspondingly the size C') is based on the physical parameters between the cameras that capture the input images 302 and 304 being processed. In some cases, the parameter is based on the distance between the cameras. The asymmetric search window (and correspondingly the size C') is also based on the accuracy of the calibration engine 308, so the value of C' decreases as the calibration engine 308 increases in accuracy or as the distance between the two cameras decreases.

Pooling layers may be used in the neural network 310 to increase receptive fields of the feature extractors so that the neural network 310 can have a global context or understanding of the input images 302 and 304. Convolution layers can be used to increase the receptive fields additively, while the pooling layers can increase the receptive fields multiplicatively. Note that pooling layers can introduce information loss. For example, in a 2×2 max pooling layer, 75% of the information may be discarded. Generally, in classification-type applications, five 2×2 pooling operations can be used to achieve an output stride of 32, which corresponds to a significant amount of information being discarded. However, in pixel-to-pixel applications such as semantic segmentation, disparity, or optical flow estimations, the output resolution is typically the same as the input resolution. As such, more information is needed to pass through the neural network 310. As a result, wavelet and inverse wavelet transforms can be used to provide both spatial resolution reduction and information preservation. Wavelet transforms are invertible and can achieve the same spatial resolution reduction effect as the pooling layer without the information loss, so wavelet and inverse wavelet transforms can be used in the neural network 310. Additional details of the wavelet and inverse wavelet transforms are provided below.

The refinement layers of the neural network 310 restore the spatial resolution to the feature maps that are generated by the normalized correlation layer. This results in the production of the depth map 312, which can be output by the neural network 310. Additional details of the neural network are provided below.

In some embodiments, the neural network 310 also generates a confidence map associated with the depth map 312. The confidence map can be obtained by applying softmax operations over the channel dimension of the feature maps. The confidence map may indicate a decrease in confidence of pixel matching in homogeneous and occluded regions of the input images 302 and 304. The confidence map can be used in rendering for filtering, blending, or other purposes.

A renderer 314 is used to generate the Bokeh image 316 based on the depth map 312 and at least one of the images 302 and 304. For example, the renderer 314 may generate the Bokeh image 316 based on a focus point 306, the input image 302, and the depth map 312. In some embodiments, the cameras that captured the input images 302 and 304 can be designated as a main camera and a secondary camera. For instance, if a user desires to capture an image of a scene using a telephoto lens, the camera that includes the telephoto lens of the electronic device 101 can be designated as the main camera, while another camera of the electronic device 101 can be designated as the secondary camera. Similarly, if the user desires to capture an image of a scene using a wide angle lens, the camera that includes the wide angle lens of the electronic device 101 can be designated as the main camera, while another camera of the electronic device 101 (such as a camera that includes an ultra-wide angle lens) can be designated as the secondary camera. Whatever the designations, the focus point 306 may correspond to a position of focus within an image that is captured by the main camera. As a result, the focus point 306 when combined with the depth map 312 can identify a focal plane. The focal plane represents the distance (or depth) of desired focus by the main camera in a scene.

The renderer 314 also generates the Bokeh effect in the Bokeh image 316 by applying suitable blurring to the image 302. For example, the renderer 314 can generate a circle of confusion (CoC) map based on the focus point 306 of the main camera and the depth map 312. In the CoC map, the level of blurriness increases as distance from the focal plane increases. That is, content in the image 302 will be assigned an increasingly larger level of blurriness as the content is further from the focal plane as indicated by the depth map 312. If the neural network 310 also generates and outputs a confidence map, the renderer 314 can use the confidence map when generating the Bokeh effect for the Bokeh image 316. For instance, the renderer 314 may perform an alpha blending that mixes an in-focus image 302 with the CoC map using the confidence map. Since the confidence map indicates the accuracy of the pixel matching used in the creation of the depth map 312, the renderer 314 can increase or decrease the alpha blending accordingly.

In addition to generating the Bokeh image 316, the renderer 314 may use the focus point 306 and the depth map 312 to provide various other effects, such as variable focus, variable aperture, art Bokeh, and the like. The variable focus effect generates a new image that changes the position of the focus within the image that corresponds to the main camera. The variable aperture effect corresponds to an adjustable CoC map. The art Bokeh effect enables an adjustable kernel shape of spots of light within the image that corresponds to the main camera, such as by changing the shape of background lights within the image.

In order to generate the depth maps 312 for various scenes, the neural network 310 is trained prior to be placed into use. The training establishes the parameters of the neural network 310 used for performing various functions, such as generating and processing feature maps. In some embodiments, the neural network 310 undergoes three training stages prior to being placed into use. During a first stage of training, the neural network 310 can be trained using synthetic data, and weights between the feature extractors can be shared while processing extracted features from stereo images. During a second stage of training, the neural network 310 learns photometric mappings between cameras that capture calibrated images. Photometric discrepancies may exist due to the fact that the cameras of the electronic device 101 usually will have different lenses (such as a telephoto lens, a wide angle lens, an ultra-wide angle lens, and the like), different image signal processors, different settings, different tunings, and the like. During a third stage of training, the neural network 310 does not share the weights between the feature extractors, enabling the feature extractors to be trained with independent weights.

The various operations performed in the neural network architecture 300 can be implemented in any suitable manner. For example, each of the operations performed in the neural network architecture 300 can be implemented or supported using one or more software applications or other software instructions that are executed by at least one processor 120 of the electronic device 101 or server 106. In other embodiments, at least some of the operations performed in the neural network architecture 300 can be implemented or supported using dedicated hardware components. In general, the operations of the neural network architecture 300 can be performed using any suitable hardware or any suitable combination of hardware and software/firmware instructions.

Although FIG. 3 illustrates one example of a neural network architecture 300, various changes may be made to FIG. 3. For example, the neural network architecture 300 can receive and process more than two input images. Also, the tasks performed using the neural network architecture 300 may or may not involve image processing.

Figure 4:
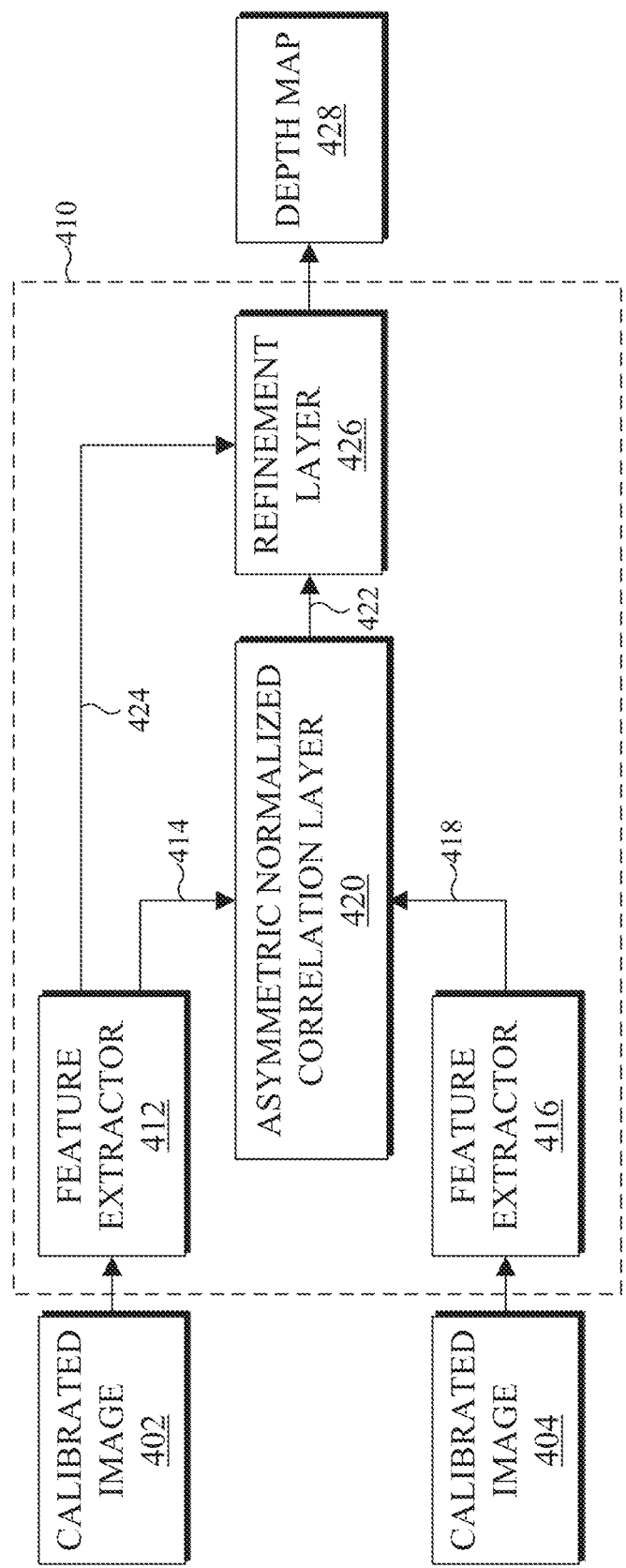
FIG. 4 illustrates a detailed example of a neural network including an asymmetric normalized correlation layer in accordance with this disclosure.

FIG. 4 illustrates a detailed example of a neural network 410 including an asymmetric normalized correlation layer 420 in accordance with this disclosure. The neural network 410 shown in FIG. 4 may, for example, represent a more detailed view of the neural network 310 shown in FIG. 3. For ease of explanation, the neural network 410 is described as being implemented using the electronic device 101 or the server 106 in the network configuration 100 of FIG. 1. However, the neural network 410 may be used by any other suitable device(s) and in any other suitable system(s). Also, the neural network 410 is described as being used to perform specific image processing-related tasks, such as creating the Bokeh effect in an image. However, the neural network 410 may be used to perform any other suitable tasks, including non-image processing tasks.

As shown in FIG. 4, the neural network 410 generally operates to receive multiple calibrated input images 402 and 404 and generate a depth map 428. The calibrated input images 402 and 404 may, for example, represent the input images 302 and 304 after processing by the calibration engine 308. Note that the neural network 410 shown here may be used to process any suitable input data and is not limited to processing image data. Also note that the neural network 410 may receive and process more than two calibrated images. In other embodiments, additional calibrated images can be input into the neural network 410. For each additional calibrated image, an additional feature extractor can be provided in the neural network 410.

In this example, the calibrated image 402 is input to a feature extractor 412, and the calibrated image 404 is input to a feature extractor 416. The feature extractor 412 generates a feature map 414, such as a feature map with dimensions (H, W, C). Similarly, the feature extractor 416 generates a feature map 418, such as a feature map with dimensions (H, W, C). In some embodiments, the feature extractors 412 and 416 utilize convolution and pooling layers to reduce the spatial resolution of the calibrated images 402 and 404 while increasing the depth of the feature maps 414 and 418. In particular embodiments, an invertible wavelet layer performs the spatial resolution reduction.

The feature maps 414 and 418 are input into an asymmetric normalized correlation layer 420. In some embodiments, the asymmetric normalized correlation layer 420 applies an independent random binary mask to the feature maps 414 and 418. The binary mask blocks random pixels along the channel dimension of each of the feature maps 414 and 418. For example, at a particular (H, W) location in each feature map 414 and 418, the channel dimension can be blocked. The binary mask is random so that random pixels in the feature map 414 and random pixels in the feature map 418 are blocked. In some embodiments, a value of zero with a probability of 0.25 is assigned to each of the pixels that are blocked in the feature maps 414 and 418. The binary mask can be applied to the feature maps 414 and 418 to force the asymmetric normalized correlation layer 420 to learn how to match features, even if a small portion of a view is blocked. Among other things, the binary mask can be used to determine the accuracy of the calibration engine 308.

An asymmetric search window can be used by the asymmetric normalized correlation layer 420 to perform the matching between the feature maps 414 and 418, helping to ensure that the search is asymmetric in order to maximize the search efficiency. For example, the size of the asymmetric search window may be based on the distance between the cameras that capture the input images that were calibrated to form the calibrated images 402 and 404 and the accuracy of the calibration engine 308. The size of the asymmetric search window may also be based on various dimensions denoted dx+, dx−, dy−, and dy+. For cameras that have a larger baseline, a larger dx+ value can be assigned to the search window. For cameras that have smaller baseline, a smaller dx+ value can be assigned to the search window. The accuracy of calibration can also change the dimensions. For instance, when the accuracy of the calibration engine 308 is high, the dimensions dx−, dy−, and dy+ can be set to smaller values. Additional details regarding the asymmetric search window are provided below.

The dx+ dimension is often larger than the other dimensions since dx+ is based on the physical distance between cameras, while dx−, dy−, and dy+ are based on calibration accuracy. For example, dx+ can be 16, dx− can be 2, dy− can be 2, and dy+ can be 2 for a feature map spatial resolution of 256×192 (H×W). When dx+ is 16, dx− is 2, dy− is 2, and dy+ is 2, the size of the asymmetric search window is 72 since (16+2)×(2+2) equals 72. It is noted that the asymmetric search window is an improvement over a symmetric search window since a symmetric search window is based on the largest dimension, which causes the size of the symmetric search window to be much larger. In some embodiments, the asymmetric normalized correlation layer 420 sets the size of the asymmetric search window based on the identified calibration accuracy and the physical distance between the cameras that capture images. In some cases, the physical distance between the cameras can change from image to image, as each camera may include an optical image stabilizer (OIS) that slightly moves a camera sensor to compensate for movement while capturing an image.

The size of the asymmetric search window indicates the number of search directions (u, v) for which the asymmetric normalized correlation layer 420 calculates a channel-normalized cross correlation. Thus, the asymmetric normalized correlation layer 420 can calculate the channel-normalized correlation between the feature map 414 and a shifted version of the feature map 418 to generate one channel of a new feature map 422. The asymmetric normalized correlation layer 420 can repeat this process for all directions based on the size of the asymmetric search window. For instance, if the size of the asymmetric search window is 72 (based on the previous example), the asymmetric normalized correlation layer 420 can calculate the channel-normalized correlation between the feature map 414 and the shifted feature map 418, where the feature map 418 is shifted 72 times to generate the new feature map 422. In this example, the new feature map 422 will have dimensions of 256×192×72.

The asymmetric normalized correlation layer 420 can also normalize the values of the new feature map, such as by normalizing the values to be within the range [0, 1]. In some embodiments, the feature map values can be normalized by subtracting mean (average) values and dividing the remaining variances in the input feature maps. Equations (2) and (3) below describe one possible implementation of the normalization to ensure that the output feature map is constrained to the range [0, 1].

$$F_0^{(u,v)} = \frac{<F_L, F_R^{(u,v)}> e}{\in + \text{var}_e(F_L) * \text{var}_e(F_R^{(u,v)})} \quad (2)$$

$$<F_L, F_R^{(u,v)}> e(i, j) = \sum_{k=0}^{C-1} [F_L(i, j, k) - \overline{F_L(i, J, :)}][F_{LR}(i-u, j-v, k) - \overline{F_R(i-u, J-v, :)}] \quad (3)$$

Here, $F_0^{(u,v)}$ represents the output feature map in two dimensions (2D), $F_L$ and $F_R^{(u,v)}$ represent the left and right input feature maps in 3D, and $F_L$ and $F_R^{(u,v)}$ represent the feature maps 414 and 418. Also, $var_e$ represents the variance and mean of the feature map over the channel dimension, and $\in$ represents a specific value (such as $10^{-5}$) to prevent the possibility of dividing by zero. Equations (2) and (3) can be used for all directions (u, v) in the search window and stacked in the 2D feature maps $F_O^{(u,v)}$ along the channel dimension to generate the 3D feature map 422.

Note that while shown and described as processing two calibrated input images 402 and 404, the asymmetric normalized correlation layer 420 is not limited to stereo matching applications. Rather, the asymmetric normalized correlation layer 420 can be used by any neural network that performs matching of feature maps, regardless of whether the feature maps are associated with two inputs or more than two inputs. Also, the asymmetric normalized correlation layer 420 can be used by any neural network to support other image processing functions or other functions. As a particular example, the asymmetric normalized correlation layer 420 could be applied to face verification, which matches high-level features of multiple faces.

A refinement layer 426 generates the depth map 428 by restoring spatial resolution to the generated feature map 422. In this example, the feature extractor 412 feeds one or more intermediate feature maps 424 forward to the refinement layer 426 for use in restoring the spatial resolution to the generated feature map 422. In some embodiments, an invertible wavelet layer performs the spatial resolution reduction in the feature extractor 412, and the invertible wavelet layer can provide the refinement layer 426 with the necessary information to restore the spatial resolution to the generated feature map 422.

The various operations performed in the neural network 410 can be implemented in any suitable manner. For example, each of the operations performed in the neural network 410 can be implemented or supported using one or more software applications or other software instructions that are executed by at least one processor 120 of the electronic device 101 or server 106. In other embodiments, at least some of the operations performed in the neural network 410 can be implemented or supported using dedicated hardware components. In general, the operations of the neural network 410 can be performed using any suitable hardware or any suitable combination of hardware and software/firmware instructions.

Although FIG. 4 illustrates one detailed example of a neural network 410 including an asymmetric normalized correlation layer 420, various changes may be made to FIG. 4. For example, the neural network 410 may include any suitable number of convolutional layers, pooling layers, or other layers as needed or desired. Also, the neural network 410 can receive and process more than two input images. In addition, the tasks performed using the neural network 410 may or may not involve image processing.

Figure 5:
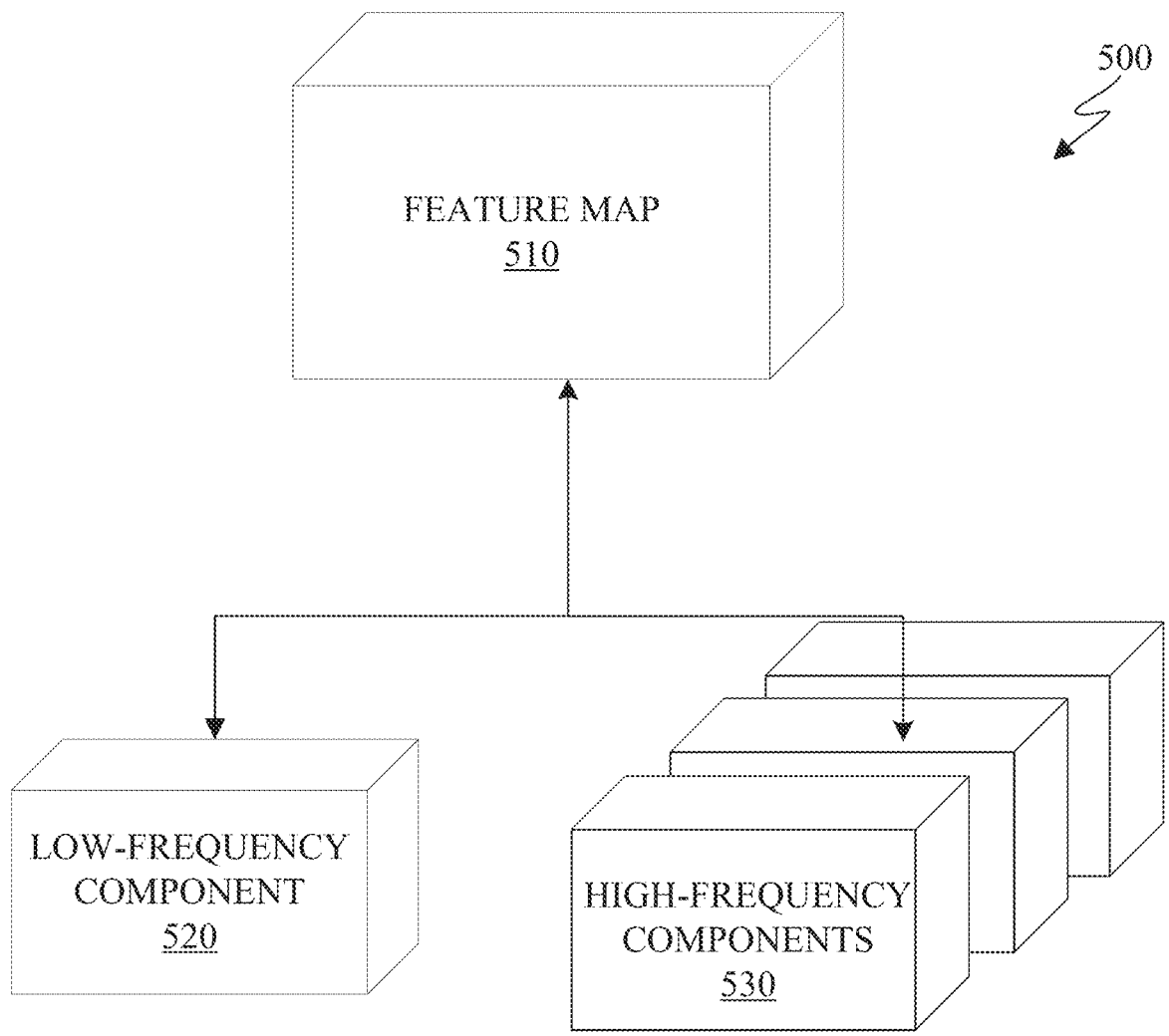
FIG. 5 illustrates an example application of an invertible wavelet layer of a neural network in accordance with this disclosure.

FIG. 5 illustrates an example application of an invertible wavelet layer 500 of a neural network in accordance with this disclosure. The invertible wavelet layer 500 may, for example, be used in the neural network 310 of FIG. 3 or the neural network 410 of FIG. 4. For ease of explanation, the invertible wavelet layer 500 is described as being implemented using the electronic device 101 or the server 106 in the network configuration 100 of FIG. 1. However, the invertible wavelet layer 500 may be used by any other suitable device(s) and in any other suitable system(s). Also, the invertible wavelet layer 500 is described as being used to perform specific image processing-related tasks, such as creating the Bokeh effect in an image. However, the invertible wavelet layer 500 may be used to perform any other suitable tasks, including non-image processing tasks.

As described above, the invertible wavelet layer 500 can be applied to iteratively decompose and synthesize feature maps. In FIG. 4, for example, the invertible wavelet layer 500 can be used in one or more of the feature extractors 412 and 416 to reduce the spatial resolution of the calibrated images 402 and 404 while increasing the depth of the feature maps 414 and 418. In FIG. 5, the invertible wavelet layer 500 receives and decomposes a feature map 510 into four elements, namely a low-frequency component 520 (such as averaged information) and three high-frequency components 530 (such as detailed information). The high-frequency components 530 can be stacked in the channel dimension to form a new feature map.

The low-frequency component 520 may represent a first feature map that is generated by the invertible wavelet layer 500. In some cases, the low-frequency component 520 has dimensions of (H/2, W/2, C). The high-frequency components 530 may collectively represent a second feature map generated by the invertible wavelet layer 500. In some cases, the high-frequency components 530 collectively have dimensions of (H/2, W/2, 3C). The low-frequency component 520 and the high-frequency components 530 are processed differently by the neural network 310 of FIG. 3 or the neural network 410 of FIG. 4. For example, the neural network 310 or 410 can iteratively process the low-frequency component 520 to gain a global context understanding of image data without interference from local details. The high-frequency components 530 can be used for restoring spatial resolution of the output of the neural network 310 or 410, such as the new feature map 422.

In some embodiments, before the feature maps 414 and 418 are processed by the asymmetric normalized correlation layer 420 of FIG. 4, the invertible wavelet layer 500 reduces the low-frequency component 520 by a factor of eight (although other reduction factors can be used). Also, in some embodiments, one or more convolution modules in the neural network 310 or 410 can have a stride of one. Further, in some embodiments, one convolution module in the neural network 310 or 410 can include more than one convolution block, where each convolution block performs a 1×1 convolution expansion step, a 3×3 depth-wise convolution step, and a 1×1 convolution projection step. If (after the projection) the resulting feature maps have the same number of channels as the input feature map, an additional identify branch connects the input and output feature maps.

Although FIG. 5 illustrates one example of an application of an invertible wavelet layer 500 of a neural network, various changes may be made to FIG. 5. For example, any other suitable layers may be used in the neural network architecture 300 or in the neural network 410.

Figure 6A:
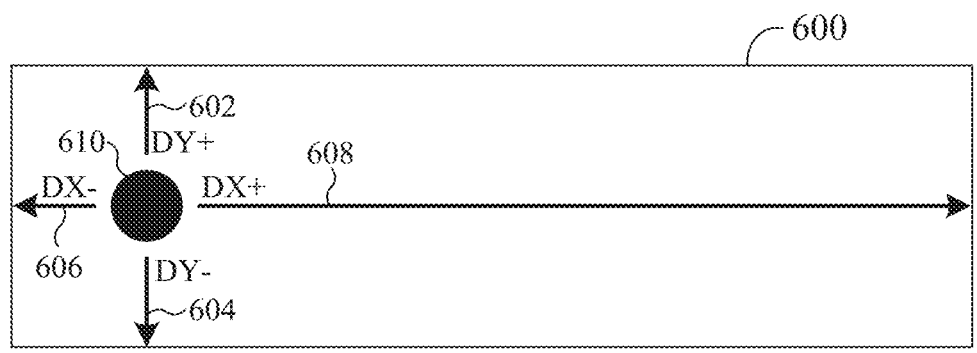
FIGS. 6A and 6B illustrate an example asymmetric search window used in an asymmetric normalized correlation layer and an example application of an asymmetric normalized correlation layer in accordance with this disclosure.
Figure 6B:
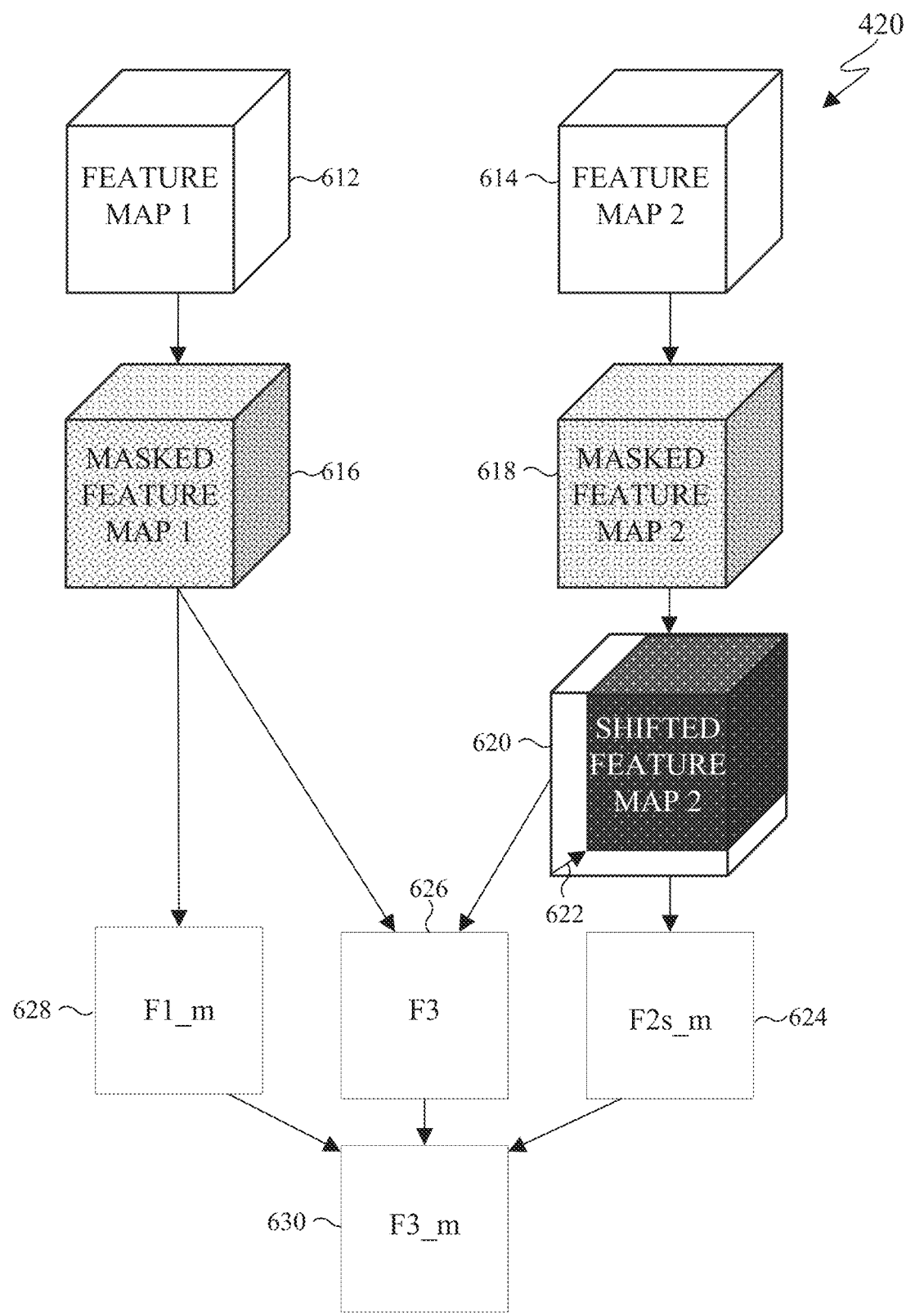

FIGS. 6A and 6B illustrate an example asymmetric search window 600 used in an asymmetric normalized correlation layer 420 and an example application of the asymmetric normalized correlation layer 420 in accordance with this disclosure. For ease of explanation, the asymmetric search window 600 and the asymmetric normalized correlation layer 420 are described as being implemented using the electronic device 101 or the server 106 in the network configuration 100 of FIG. 1. However, the asymmetric search window 600 and the asymmetric normalized correlation layer 420 may be used by any other suitable device(s) and in any other suitable system(s). Also, the asymmetric search window 600 and the asymmetric normalized correlation layer 420 are described as being used to perform specific image processing-related tasks, such as creating the Bokeh effect in an image. However, the asymmetric search window 600 and the asymmetric normalized correlation layer 420 may be used to perform any other suitable tasks, including non-image processing tasks.

As shown in FIG. 6A and discussed above, the asymmetric search window 600 is based four dimensions, namely dimension 602 (dy+), dimension 604 (dy−), dimension 606 (dx−, and dimension 608 (dx+). The dimensions 602, 604, 606, and 608 are measured from pixel 610 to the parameter of the asymmetric search window 600. The sizes of the dimensions 602, 604, 606, and 608 can be based on camera baseline distance and the accuracy of the calibration engine 308. For example, if dy+ is 2, dy− is 2, dx− is 2, and dx+ is 16, the size of the asymmetric search window 600 is 72. Given this, the asymmetric normalized correlation layer 420 can shift the feature map 418 a total of 72 times and perform a channel-normalized cross-correlation operation to generate the feature map 422. In some embodiments, the dimensions 602, 604, and 606, are the same size, and the dimension 608 is larger than the dimensions 602, 604, and 606.

As shown in FIG. 6B, the asymmetric normalized correlation layer 420 receives a feature map 612 and a feature map 614. The feature map 612 may represent the feature map 414 of FIG. 4, and the feature map 614 may represent the feature map 418 of FIG. 4. The asymmetric normalized correlation layer 420 randomly applies a binary mask to the feature map 612 to create a masked feature map 616, and the asymmetric normalized correlation layer 420 randomly applies a binary mask to the feature map 614 to create a masked feature map 618. As discussed above, the binary mask blocks random channel values in the feature maps 612 and 614 to produce the masked feature maps 616 and 618. Blocking random channel values can force the neural network 310 or 410 to learn matchings even if a small portion of a view in an image is blocked.

The masked feature map 618 is subjected to a shifting operation 620, which shifts the masked feature map 618 multiple times in one or more directions 622. The shifting here is based on the asymmetric search window 600 shown in FIG. 6A. For each shift of the masked feature map 618 in a particular (u, v) direction 622, multiple feature maps 624, 626, and 628 are generated. The number of times that the masked feature map 618 is shifted can be based on the size of the asymmetric search window 600. For example, when the dimensions of the asymmetric search window 600 are dy+=2, dy−=2, dx−=2, and dx+=16, the masked feature map 618 is shifted 72 times, resulting in the production of 72 sets of feature maps 624, 626, and 628. The shifting of the masked feature map 618 can occur in the (u, v) direction, where u is between −2 and 16 and v is between −2 and 2.

To generate each set of feature maps 624, 626, and 628, the asymmetric normalized correlation layer 420 can perform feature matching by calculating the inner product and the mean of the masked feature map 616 and the masked feature map 618 as shifted. For example, the asymmetric normalized correlation layer 420 can calculate the inner product between the masked feature map 616 and the shifted masked feature map 618 as shifted along the channel dimension to generate the feature map 626. The asymmetric normalized correlation layer 420 can also calculate the mean of the masked feature map 616 along the channel dimension to generate the feature map 628, and the asymmetric normalized correlation layer 420 can calculate the mean of the masked feature map 618 as shifted along the channel dimension to generate the feature map 624. The collection of feature maps 624, 626, and 628 represents a single channel feature map.

The asymmetric normalized correlation layer 420 then normalize the feature map 626 using the feature maps 624 and 628 to generate a normalized feature map 630. In some embodiments, the asymmetric normalized correlation layer 420 normalizes the feature map 626 using Equation (4) below.

$$F_{3m} = \frac{(F_3 - C * F_{1\_m} * F_{2s\_m})^2}{(F_{1\_m}^2 - C * F_{2s\_m}^2 + \varepsilon)(F_{2s\_m}^2 - C * F_{2s\_m}^2 + \varepsilon)} \quad (4)$$

The normalized feature map 630 is a 2D feature map since it corresponds to a single channel. However, by generating a normalized feature map 630 for each shift of the masked feature map 618, the asymmetric normalized correlation layer 420 generates new feature maps 624, 626, and 628, and a new normalized feature map 630 is generated for that shift of the masked feature map 618. Each new normalized feature map 630 corresponds to a different channel, and the multiple normalized feature maps 630 can be stacked. The stacking of the normalized feature maps 630 adds depth and thereby forms a 3D feature map with dimensions of (H, W, C'), where C' corresponds to the number of shifts of the masked feature map 618 (which is based on the size of the asymmetric search window 600).

The collection of normalized feature maps 630 may represent the new feature map 422 that is output to the refinement layer 426 of FIG. 4. Note that when the invertible wavelet layer 500 is used to reduce the low-frequency component 520 by a factor as discussed above, the refinement layer 426 (using the high-frequency components 530) operates to restore the spatial resolution to the normalized feature maps 630 in order to generate the depth map 428.

Although FIGS. 6A and 6B illustrate one example of an asymmetric search window 600 used in an asymmetric normalized correlation layer 420 and one example application of the asymmetric normalized correlation layer 420, various changes may be made to FIGS. 6A and 6B. For example, the size of the asymmetric search window 600 may vary based on the characteristics of the electronic device 101, such as the physical distance between cameras and the accuracy of the calibration. Also, the asymmetric normalized correlation layer 420 may process any other numbers of input feature maps, which can be based on the number of input images being processed.

Figure 7:
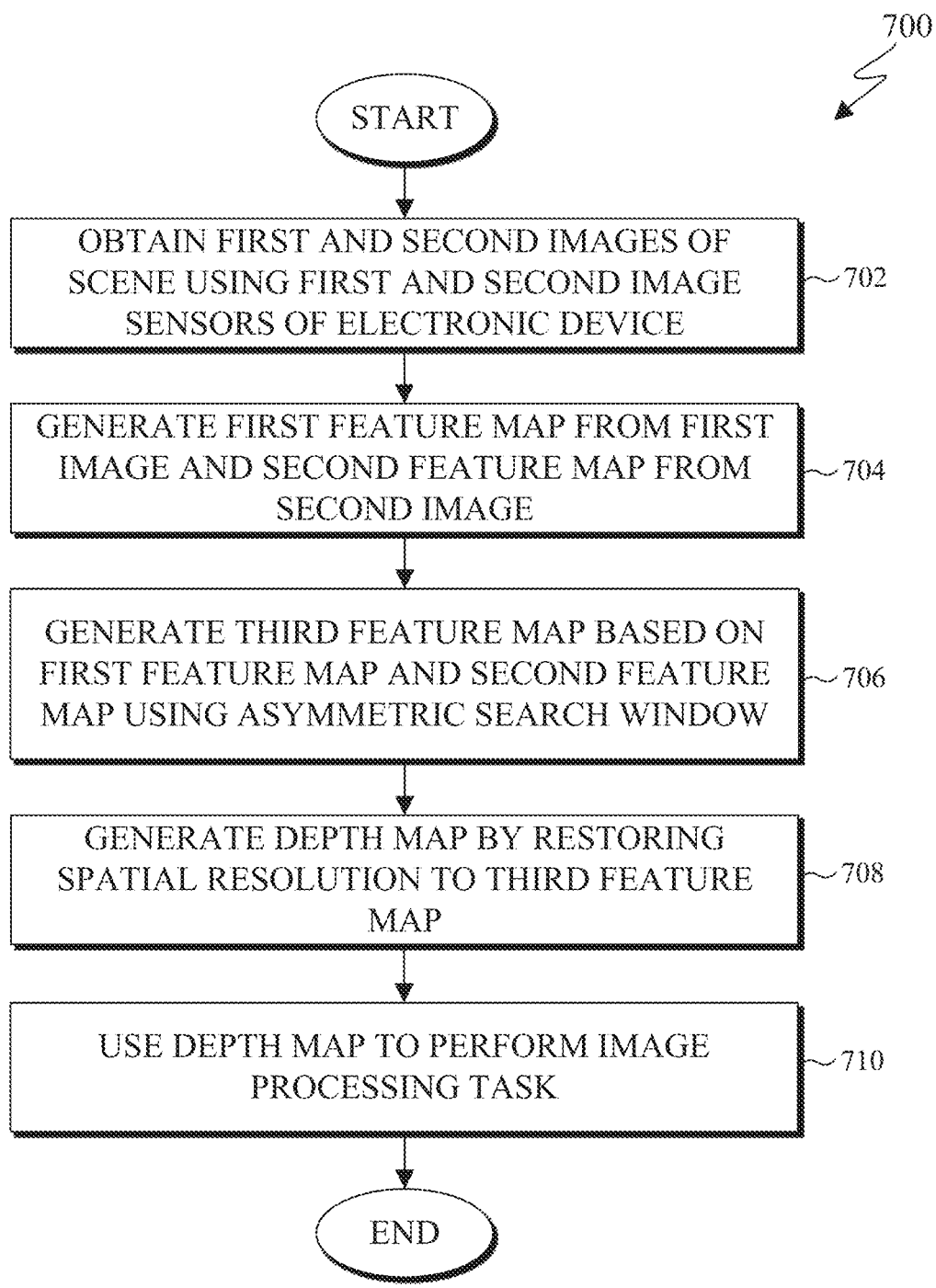
FIG. 7 illustrates an example method for using an asymmetric normalized correlation layer for deep neural network feature matching in accordance with this disclosure.

FIG. 7 illustrates an example method 700 for using an asymmetric normalized correlation layer for deep neural network feature matching in accordance with this disclosure. More specifically, FIG. 7 illustrates an example method 700 for generating a depth map using the asymmetric normalized correlation layer 420 in a neural network 310 or 410, where the generated depth map is used to perform an image processing task. For ease of explanation, the method 700 of FIG. 7 is described as involving the use of the neural network architecture 300 of FIG. 3 in the network configuration 100 of FIG. 1. However, the method 700 may involve the use of any suitable neural network architecture designed in accordance with this disclosure, and the asymmetric normalized correlation layer 420 may be used in any other suitable device or system.

In step 702, the neural network architecture 300 obtains input data, such as multiple input images. The input images represent two or more images of a scene, such as images that are captured by different cameras or other image sensors of an electronic device. For example, a first image of the scene can be obtained using a first image sensor of the electronic device, and a second image of the scene can be obtained using a second image sensor of the electronic device. Note that the neural network architecture 300 may be implemented in an end-user device (such as an electronic device 101, 102, or 104) and process data collected or generated by that end-user device, or the neural network architecture 300 may be implemented in one device (such as a server 106) and process data collected or generated by another device (such as an electronic device 101, 102, or 104).

In step 704, the neural network architecture 300 generates a first feature map from the first image and a second feature map from the second image. For example, images 302 and 304 may be processed by the calibration engine 308 to modify at least one of the images 302 and 304 and produce calibrated images 402 and 404. The calibrated images 402 and 404 can then be processed by the feature extractors 412 and 416 to produce the feature maps 414 and 416. In some embodiments, the neural network architecture 300 uses separate feature extractors to generate different feature maps. For instance, the feature map 414 can be generated by the feature extractor 412, and the feature map 418 can be generated by the feature extractor 416. If additional input images are obtained in step 702, additional feature extractors may be utilized to generate additional feature maps for those images. In some embodiments, the feature extractors operate to generate the feature maps in parallel, meaning concurrently during the same or similar period of time.

In step 706, the neural network architecture 300 generates a third feature map based on the first feature map and the second feature map using an asymmetric search window. The size of the asymmetric search window is based on the accuracy of the calibration algorithm that calibrated the input images and the distance(s) between the cameras that captured the images. In some cases, the asymmetric search window may be longer in the horizontal direction than in the vertical direction. The size of the asymmetric search window corresponds to the number of times that the second feature map is shifted when performing the feature matching to generate the third feature map. In some embodiments, to generate the third feature map, the neural network architecture 300 applies a binary mask across random channels of the first and second feature maps. The binary mask can be used to identify errors in the calibration process or a level of accuracy of the calibration process when the calibrated images are generated. After the mask is applied to the second feature map, the second feature map is shifted a number of times based on the size of the asymmetric search window. For each shift of the second feature map, the neural network architecture 300 calculates a channel-normalized cross-correlation between the first feature map and the shifted version of the second feature map to identify channel values for the third feature map. This can occur as described above. This is repeated for each shift of the second feature map such that multiple single-channel feature maps are generated. The multiple single-channels feature maps can then be stacked to form the third feature map.

In step 708, the neural network architecture 300 generates a depth map by restoring spatial resolution to the third feature map. For example, the neural network architecture 300 can restore spatial resolution to the third feature map using the refinement layer 426. In some cases, the neural network architecture 300 can decompose the first feature map into multiple components, such as multiple high-frequency components 530 and a low-frequency component 520. In these embodiments, the neural network architecture 300 may use an invertible wavelet layer to decompose the first feature map. The low-frequency component 520 of the first feature map provides global context of an image without interference from local details, while the high-frequency components 530 of the first feature map are used to restore spatial resolution to the third feature map when generating the depth map.

In step 710, an image processing task is performed using the depth map. For example, the neural network architecture 300 can identify a focus point within one of the captured images. Based on the position of the focus point, the neural network architecture 300 can identify a depth plane within the depth map that corresponds to the focus position within the image. The neural network architecture 300 then blurs portions of the captured image based on their identified distances from the depth plane, such as by increasing a level of blurriness at larger depths. This allows the neural network architecture 300 to produce the Bokeh effect in the final image of the scene.

Although FIG. 7 illustrates one example of a method 700 for using an asymmetric normalized correlation layer 420 for deep neural network feature matching, various changes may be made to FIG. 7. For example, while shown as a series of steps, various steps in FIG. 7 may overlap, occur in parallel, or occur any number of times. Also, the method 700 may process any suitable input data and is not limited to use with image processing tasks.

Although the present disclosure has been described with reference to various example embodiments, various changes and modifications may be suggested to one skilled in the art. It is intended that the present disclosure encompass such changes and modifications as fall within the scope of the appended claims.

What is claimed is:

1. A method comprising:
obtaining a first image of a scene using a first image sensor of an electronic device and a second image of the scene using a second image sensor of the electronic device;
generating a first feature map from the first image and a second feature map from the second image;
generating a third feature map based on the first feature map and the second feature map, using an asymmetric search window; and
generating a depth map by restoring spatial resolution to the third feature map.

2. The method of claim 1, wherein generating the first feature map and the second feature map comprises:
modifying at least one of the first image and the second image to generate a calibrated image pair; and
using the calibrated image pair to generate the first feature map and the second feature map.

3. The method of claim 1, further comprising:
identifying high-frequency components and a low-frequency component of the first feature map, wherein the high-frequency components are used to restore the spatial resolution to the third feature map.

4. The method of claim 1, wherein the asymmetric search window includes at least two different distances for at least two different directions in the asymmetric search window.

5. The method of claim 1, wherein the first feature map and the second feature map are generated in parallel using different feature extractors in a neural network.

6. The method of claim 1, wherein generating the third feature map comprises:
applying a random binary mask across the first feature map and the second feature map to generate a masked first feature map and a masked second feature map; and identifying the third feature map by calculating channel-normalized cross-correlations between the first masked feature map and shifted versions of the second masked feature map, wherein the second masked feature map is shifted multiple times based on a size of the asymmetric search window.

7. The method of claim 1, further comprising:
obtaining a focus point within the first image; and
using the depth map to generate a Bokeh effect by blurring portions of the first image that correspond to depths that are different than a depth associated with the focus point.

8. An electronic device comprising:
a first image sensor;
a second image sensor; and
at least one processor operatively coupled to the first and second image sensors and configured to:
  obtain a first image of a scene using the first image sensor and a second image of the scene using the second image sensor;
  generate a first feature map from the first image and a second feature map from the second image;
  generate a third feature map based on the first feature map and the second feature map, using an asymmetric search window; and
  generate a depth map by restoring spatial resolution to the third feature map.

9. The electronic device of claim 8, wherein, to generate the first feature map and the second feature map, the at least one processor is configured to:
modify at least one of the first image and the second image to generate a calibrated image pair; and
use the calibrated image pair to generate the first feature map and the second feature map.

10. The electronic device of claim 8, wherein:
the at least one processor is further configured to identify high-frequency components and a low-frequency component of the first feature map; and
the at least one processor is configured to restore the spatial resolution to the third feature map using the high-frequency components.

11. The electronic device of claim 8, wherein the asymmetric search window includes at least two different distances for at least two different directions in the asymmetric search window.

12. The electronic device of claim 8, wherein the at least one processor is configured to generate the first feature map and the second feature map in parallel using different feature extractors in a neural network.

13. The electronic device of claim 8, wherein, to generate the depth map, the at least one processor is configured to:
apply a random binary mask across the first feature map and the second feature map to generate a masked first feature map and a masked second feature map; and
identify the third feature map by calculating channel-normalized cross-correlations between the first masked feature map and shifted versions of the second masked feature map; and
wherein the at least one processor is configured to shift the second feature map multiple times based on a size of the asymmetric search window.

14. The electronic device of claim 8, wherein the at least one processor is further configured to:
obtain a focus point within the first image; and
use the depth map to generate a Bokeh effect by blurring portions of the first image that correspond to depths that are different than a depth associated with the focus point.

15. A non-transitory machine-readable medium containing instructions that when executed cause at least one processor of an electronic device to:
obtain a first image of a scene using a first image sensor of the electronic device and a second image of the scene using a second image sensor of the electronic device;
generate a first feature map from the first image and a second feature map from the second image;
generate a third feature map based on the first feature map and the second feature map, using an asymmetric search window; and
generate a depth map by restoring spatial resolution to the third feature map.

16. The non-transitory machine-readable medium of claim 15, further containing instructions that when executed cause the at least one processor to:
modify at least one of the first image and the second image to generate a calibrated image pair; and
use the calibrated image pair to generate the first feature map and the second feature map.

17. The non-transitory machine-readable medium of claim 15, further containing instructions that when executed cause the at least one processor to:
identify high-frequency components and a low-frequency component of the first feature map; and
use the high-frequency components to restore the spatial resolution to the third feature map.

18. The non-transitory machine-readable medium of claim 15, wherein the asymmetric search window includes at least two different distances for at least two different directions in the asymmetric search window.

19. The non-transitory machine-readable medium of claim 15, wherein the instructions that when executed cause the at least one processor to generate the third feature map comprise:
instructions that when executed cause the at least one processor to:
  apply a random binary mask across the first feature map and the second feature map to generate a masked first feature map and a masked second feature map; and
  identify the third feature map by calculating channel-normalized cross-correlations between the first masked feature map and shifted versions of the second masked feature map, wherein the second masked feature map is shifted multiple times based on a size of the asymmetric search window.

20. The non-transitory machine-readable medium of claim 15, further containing instructions that when executed cause the at least one processor to:
obtain a focus point within the first image; and
use the depth map to generate a Bokeh effect by blurring portions of the first image that correspond to depths that are different than a depth associated with the focus point.

* * * * *